United States Patent [19]

McMurtry

[11] Patent Number: 5,604,593
[45] Date of Patent: Feb. 18, 1997

[54] INTERFEROMETER POSITION MEASUREMENT SYSTEM WITH EXTENSIBLE LEGS

[75] Inventor: David R. McMurtry, Wotton-Under-Edge, United Kingdom

[73] Assignee: Renishaw plc, Gloucestershire, United Kingdom

[21] Appl. No.: 464,835

[22] PCT Filed: Nov. 25, 1994

[86] PCT No.: PCT/GB94/02593

§ 371 Date: Jun. 27, 1995

§ 102(e) Date: Jun. 27, 1995

[87] PCT Pub. No.: WO95/14905

PCT Pub. Date: Jun. 1, 1995

[30] Foreign Application Priority Data

Nov. 25, 1993 [GB] United Kingdom .................. 9324218

[51] Int. Cl.⁶ ...................................... G01B 9/02
[52] U.S. Cl. ........................ 356/358; 409/235; 409/178; 409/179; 248/371
[58] Field of Search .................................. 356/345, 358; 409/235, 201, 178, 179; 408/234, 129; 248/371, 398

[56] References Cited

U.S. PATENT DOCUMENTS 4,457,625  7/1984  Greenleaf et al. .
4,621,926  11/1986  Merry et al. .
5,387,969  2/1995  Marantette .

FOREIGN PATENT DOCUMENTS

88/07656  10/1988  WIPO .
91/03145  3/1991  WIPO .
92/17313  10/1992  WIPO .

Primary Examiner—Georgia Y. Epps
Assistant Examiner—Robert Kim
Attorney, Agent, or Firm—Oliff & Berridge

[57] ABSTRACT

A hexapod machine comprises a fixed structure (10,11) and a movable structure (14,15). Six extensible legs (18) are connected between the fixed and movable structures, and their lengths determine the relative position and orientation of the structures. The lengths of the legs are measured by respective laser interferometers (60,62). To increase the accuracy of the measurement, a retroreflector (62) of the interferometer is directly mounted to and fast with one of the structures (14,15).

13 Claims, 6 Drawing Sheets

INTERFEROMETER POSITION MEASUREMENT SYSTEM WITH EXTENSIBLE LEGS

FIELD OF THE INVENTION

This invention relates to machines in which one support or platform is supported and moved relative to another by a plurality of extensible legs or rams extending between them. There may be, for example, three or six such legs or rams, and when there are six the machine is commonly called a hexapod. Such arrangements may be used for machine tools, coordinate measuring machines, scanning machines, robots, positioning devices (e.g. for optical components), flight simulators, prototype manufacturing machines and various other uses.

BACKGROUND OF THE INVENTION

International Patent Application No. WO91/03145 (Kearney & Trecker) shows a hexapod machine tool comprising two supports or platforms and six extensible, powered legs or rams, each connected between the two supports or platforms. A tool on one of the platforms is movable relative to a workpiece on the other platform. Various desired positions and orientations between the tool and the workpiece can be achieved by extending the legs by differing amounts.

In such machines, the position and orientation at any instant is monitored by means of a plurality of length measuring transducers, e.g. one transducer associated with each leg. WO91/03145 discloses the use of six instrument arms, separate from the legs, each instrument arm containing a length measuring transducer. One possible type of length measuring transducer is a laser interferometer in each instrument arm. Taking six length measurements from the six instrument arms enables the position and orientation of one platform relative to the other to be determined. In practice, such length measurements are used in a feedback loop to the powered legs, to servo the movable platform precisely to the position and orientation required.

The instrument arms disclosed in WO91/03134 require a universally pivotable bearing at each end, to connect the arm to the respective platform. Therefore, if there are any inaccuracies such as backlash in these bearings, the measured lengths will be inaccurate and there will be a corresponding inaccuracy in the positioning and orientation of one platform relative to the other.

SUMMARY OF THE INVENTION

The present invention provides a machine comprising:

two support structures which are movable relative to each other;

a plurality of extensible legs connected between the support structures, the position and orientation of one support structure relative to the other being defined by the relative lengths of the extensible legs;

a plurality of interferometers acting between the support structures, each comprising a light emitting unit associated with one support structure and a reflector associated with the other support structure;

characterised in that the reflector is mounted fast with its associated support structure.

Preferably the light emitting unit is directed towards the corresponding reflector by a mechanical linkage connected to one of the extensible legs, or which itself forms an extensible leg, connected between the support structures.

In another aspect of the invention, there is provided an interferometer for use in such a machine, comprising:

a light emitting unit for association with one of the support structures of the machine;

a reflector capable of being made fast to the other support structures of the machine; and a mechanical linkage for connection to an extensible leg connected between said support structures, or itself forming such an extensible leg, for directing the light emitting unit towards the reflector.

BRIEF DESCRIPTION OF THE DRAWINGS

Preferred embodiments of the invention will be described by way of example, with reference to the accompanying drawings, wherein.

DESCRIPTION OF PREFERRED EMBODIMENTS

Most of the following description relates to coordinate measuring machines (CMMs), but the invention is also applicable to machine tools. Thus, the construction of the machine may be used for a machine tool, and the workpiece measurement methods described may be utilised on a machine tool by replacing the usual cutting tool with an appropriate probe and/or probe head. Similarly, the description is also applicable to scanning machines, designed for scanning or digitising the surface contours of a workpiece; to robots; to prototype manufacturing machines; to positioning devices; and to flight simulators, etc.

Figure 1:
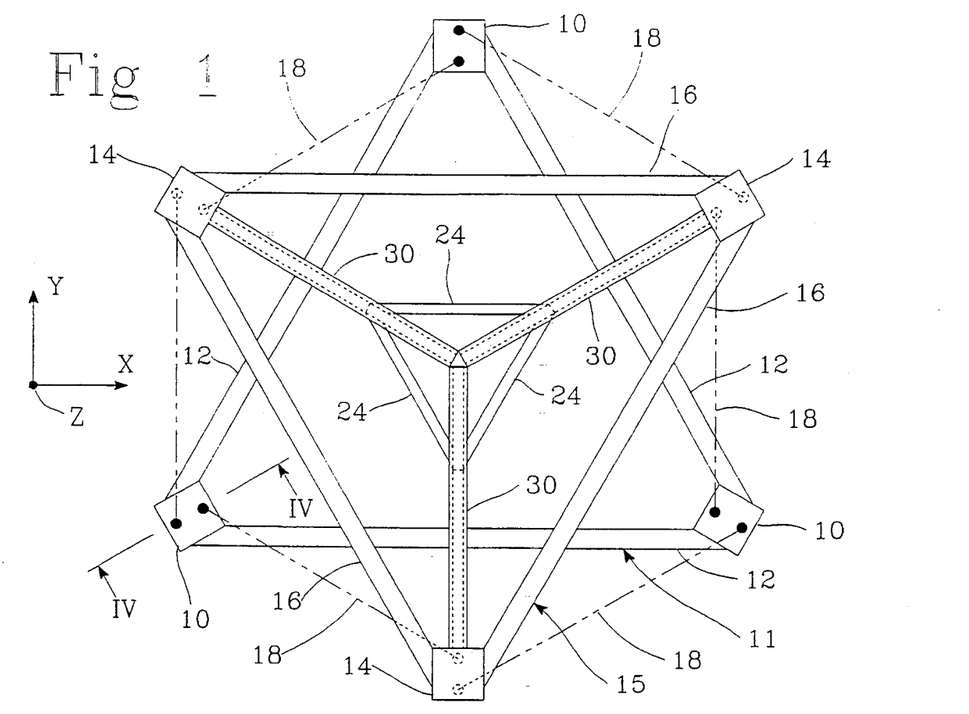
FIG. 1 is a plan view of a coordinate measuring machine.
Figure 2:
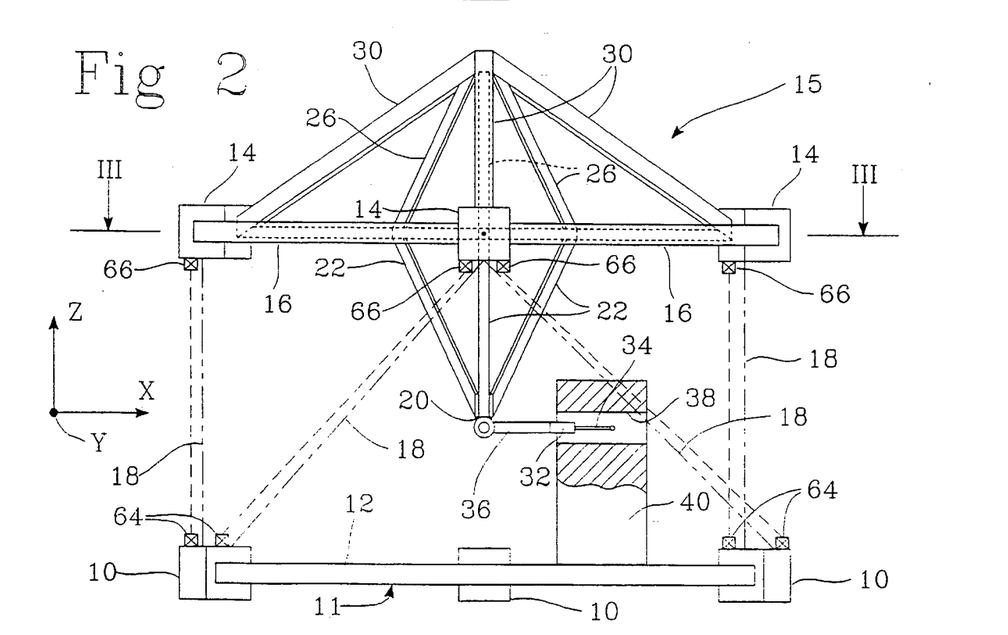
FIG. 2 is a side view of the machine of FIG. 1.
Figure 3:
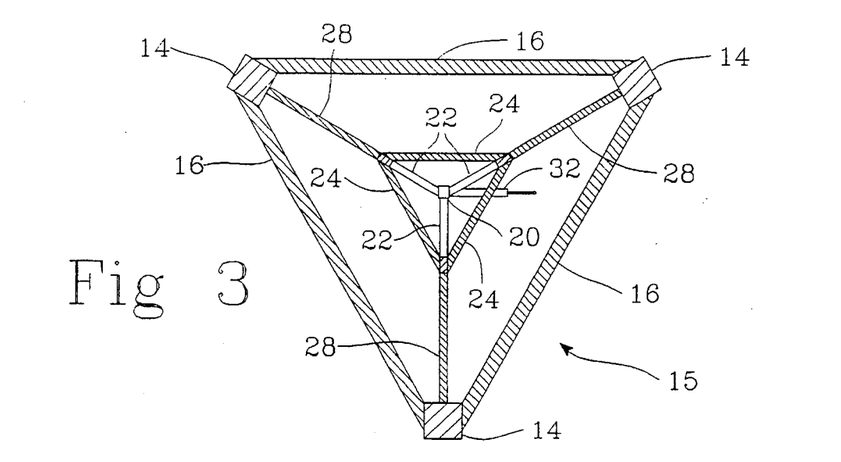
FIG. 3 is a section on the line III—III in FIG. 2.

Referring to FIGS. 1, 2 and 3, the machine comprises a triangular base structure 11 having three corner elements 10, rigidly interconnected by three stiff struts 12. Of course, other ways of producing a rigid base structure are possible, such as providing the corner elements 10 at triangularly-spaced locations on a stiff table, e.g. of granite.

Spaced above the base is another triangular frame 15, comprising three corner elements 14 rigidly interconnected by stiff struts 16. This triangular structure 15 is oriented as a mirror image of the triangular base 11, so that the plan view of FIG. 1 resembles a Star of David or hexagram.

The upper triangular structure 15 is supported above the base structure 11 by means of six powered extensible legs or rams 18 (shown only as phantom lines in FIGS. 1 and 2). Each corner element 10 is connected to two adjacent corner elements 14 by respective rams 18, and vice versa. The rams 18 may be conventional hydraulic rams, but preferably they employ friction drives as described below in relation to FIG. 4. It is also possible, in a manually operated machine, to have extensible legs which are not powered.

The upper triangular structure 15 has six degrees of freedom of movement relative to the base 11. By operating the individual rams 18 in relation to each other in an appropriate manner, the structure 15 can be translated bodily along any of three perpendicular axes X,Y,Z. Furthermore, by appropriate operation of the rams 18, the structure 15 can also be tilted or rotated about any of the axes X,Y,Z. For example, up to ±45° of such tilting or rotating movements may be provided about each axis. These translational, tilting and rotational movements may be performed under computer control, the computer being programmed with the necessary algorithms for controlling each individual ram 18 in the necessary manner to produce the desired type of movement.

A probe head 20 is rigidly connected to the upper triangular structure 15. It is desirable that it should be so connected by a structure which is both stiff and light, so that the probe head 20 moves bodily with the frame structure 15 with the least possible deflection as a result of inertia when the structure is subjected to accelerating or decelerating motions. In the embodiment shown in FIGS 1–3, the frame structure 15 includes a space frame of triangularly connected struts. The probe head 20 is located at the apex of an inverted tetrahedron formed from three struts 22, which depend from a further three struts 24. The struts 24 are arranged in a triangle, and form the base both of this tetrahedron and also of another, upwardly extending tetrahedron composed of struts 26. Three struts 28 directly connect the corners of the triangle of struts 24 to the connecting elements 14. Three further struts 30 form a superstructure which connects the apex of the upper tetrahedron to the connecting elements 14.

It will be seen that the two tetrahedrons formed by the struts 22,24,26 form a rigid, lightweight space frame. The six struts 28,30 are the minimum number kinematically necessary in order to define the location of this double tetrahedron relative to the connecting elements 14. Of course, all the struts 16,22–30 may be tubular for lightness.

The probe head 20 carries a probe 32 with a workpiece-contacting stylus 34. To enable the probe 32 to reach into awkward locations, for example into the bore 38 of the workpiece 40 shown in FIG. 2, it may be fitted to the probe head 20 via an extension arm 36. The probe 32 may be of any desired type. For example, it may be a touch trigger probe, or it may be a scanning or analogue measurement probe (which measures the deflection of the stylus 34 produced by contact with the workpiece surface). Alternatively, the probe 32 may be replaced by a non-contact probe such as an optical scanning probe, e.g. of the laser triangulation type. The probe head 20 is preferably a two-way articulating type, such as the type PH10M available from the present applicants Renishaw.

Figure 4:
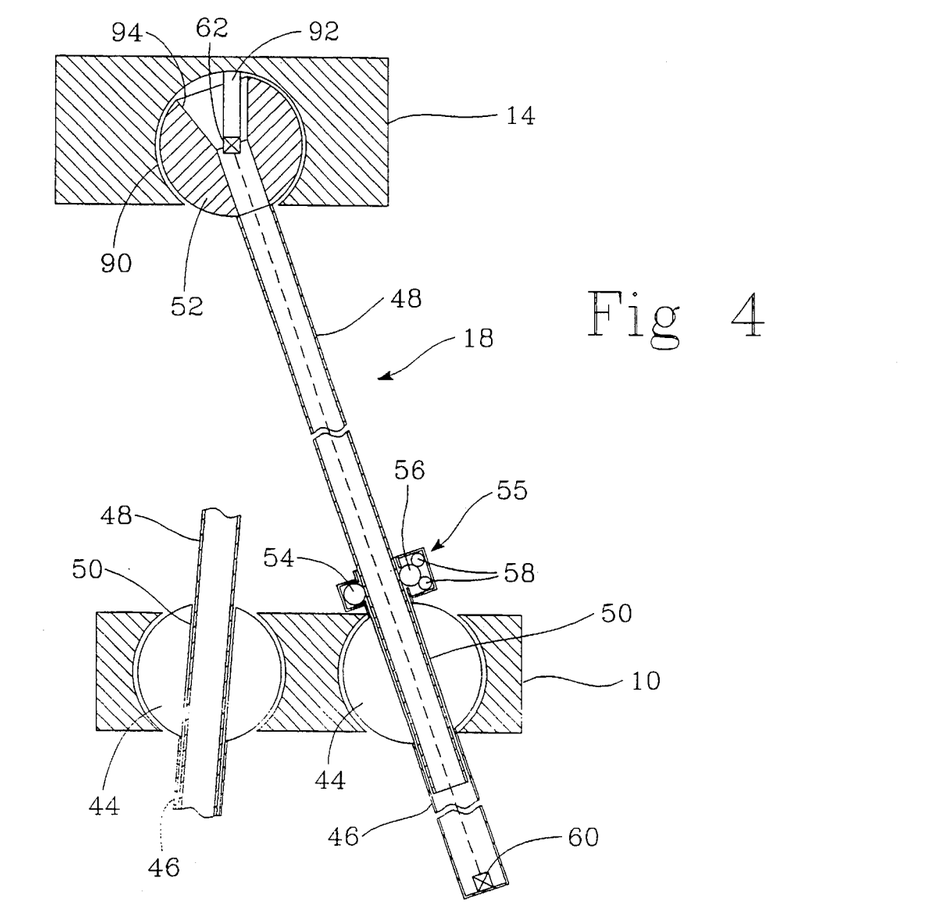
FIG. 4 shows a ram for use in the machine, viewed approximately on the line IV—IV in FIG. 1.

The construction of the rams 18 will now be discussed. These may simply be conventional hydraulic rams, as already mentioned. However, a preferred construction is shown in FIG. 4. The connecting elements 10 of the base structure 11 are provided with two spherical bearings (preferably air bearings), one for each of the rams 18 connected at that element 10. Each spherical air bearing includes a universally rotatable ball 44, to which is fixed a tubular housing 46. A tubular ram member 48 slides telescopically within the housing 46 and within a central bore 50 through the ball 44. At the free end of the tubular member 48, there is provided a further ball 52, received in a spherical air bearing 90 of the corresponding connecting member 14 of the moving structure 15.

The tubular member 48 is driven telescopically in and out of the housing 46 and bore 50 by means of a friction drive 55. This comprises a motorised drive roller 54, and an opposing reaction roller 56, both of which engage with the tubular member 48 such that rotation of the motorised drive roller 54 extends or retracts the member 48. The reaction roller 56 may have a pair of stabilising rollers 58 to ensure proper frictional engagement.

The ram construction shown in FIG. 4 is much lighter and cheaper than a hydraulic ram, and is therefore preferred since the loads present in the present machine are much smaller than might be found in (say) a machine tool.

It is of course necessary to measure the location and orientation of the moving structure 15, in order to be able to determine the coordinates of each point on a workpiece surface when addressed by the probe 32. This may be achieved by providing a scale and readhead in or on each of the six rams 18. It will be appreciated from the principles of kinematics that six linear measurements taken between individual points on the fixed structure 11 to individual points on the moving structure 15 are sufficient to determine the position and orientation of the moving structure precisely, since the structure has six degrees of freedom of movement. It may be necessary to know the distances between the individual points on the fixed structure, and between the individual points on the moving structure; or alternatively to pre-calibrate or map each position and orientation of the moving structure onto the corresponding set of six linear measurements. Such considerations can be incorporated into the algorithms by which the rams are operated under computer control.

We prefer, however, to use six interferometers in place of six scales and readheads. FIG. 4 shows one possible arrangement, in which a light emitting and detecting unit 60 of the interferometer is located at the bottom end of the housing 46. A retroreflector 62 is provided on a bracket 92 within the spherical air bearing 90, and is fast with respect to the moving structure 15. The retroreflector 62 should be of a type such as a cat's eye retroreflector, which is capable of receiving a light beam from a wide range of angles and returning it in the opposite direction back to the light emitting and detecting unit 60. The wide range of angles should be such as to accommodate all the possible angles which may exist between the ram 18 and the moving structure 15. The retroreflector 62 should be mounted on the bracket 92 so as to be at or close to the centre of rotation of the ball 52 in the air bearing 90. The ball 52 has a flared bore 94, through which the light beam passes to the retroreflector. The flare of this bore 94 accommodates the range of angular movement of the ball 52 without fouling the bracket 92 and retroreflector 62.

Figure 5:
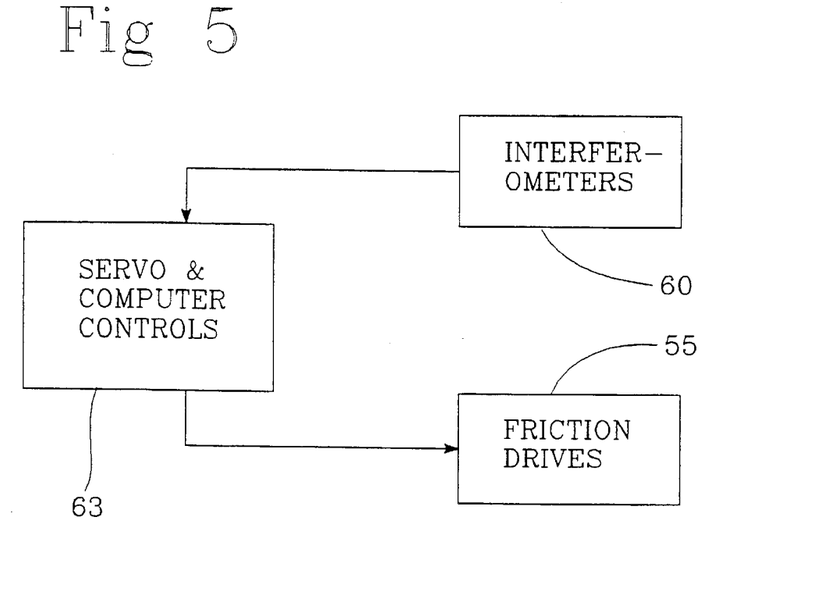
FIG. 5 is a schematic block diagram illustrating the control of the machine.

In use, all six interferometers 60 are connected in a servo loop as shown in FIG. 5. Each interferometer 60 feeds its signal to a computer control unit 63, which also controls the corresponding friction drive 55. The computer control 63 runs a computer numeric control (CNC) program for controlling the desired movement of the probe 32. The computer also contains the necessary algorithms mentioned above, which convert any desired position and orientation of the probe 32 commanded by the CNC program into demand signals for each of the friction drives 55, in order to produce the required amount of extension of the corresponding rams 18. The interferometers 60 measure and feed back the amount of extension thus produced in each ram, so that the control 63 can servo each ram to the required position.

It is not necessary for the interferometers 60 to be as closely associated with the rams 18 as shown in FIG. 4. Indeed, it can be desirable that they should not be so associated. When the interferometers are located as shown in FIG. 4, they will be affected by any deflections of the rams 18 or of the bearings in which they are mounted at each end, and thus may not accurately reflect the actual position of the moving structure 15.

One way round this problem would be to mount three retroreflectors on the probe head 20, and six interferometers 60 at various locations around the fixed structure 11. The six interferometer beams are each steered (e.g. by pivoting mirrors) and directed to track the movement of one of the retroreflectors. Such arrangements of six tracking interferometers to locate the position and orientation of a head are already known, e.g. from U.S. Pat. 4,621,926.

However, such known tracking interferometer arrangements suffer from the disadvantage that, as the probe head 20 moves around the workpiece, it is likely that one or more of the interferometer beams will be interrupted. If an interferometer beam is broken in this way, the interferometer will lose its measurement count and may also cease to track its retroreflector. The measurement operation must therefore be restarted.

In accordance with another preferred feature of the present invention, therefore, six tracking interferometers 64 are mounted on the fixed structure 11, adjacent the bearings for corresponding rams 18, as shown in FIG. 2. Six corresponding retroreflectors 66 are mounted on the moving structure 15 adjacent the opposite ends of the rams 18. The interferometers 64 and reflectors 66 should be mounted in stable positions where they are unlikely to be affected by unwanted deflections in use. Each tracking interferometer 64 tracks and measures the distance to its corresponding retroreflector 66, and from the six linear measurements obtained the computer control 64 can calculate the position and orientation of the moving structure, including the probe 32.

If desired, further tracking interferometers may be provided between the fixed and moving structures. The extra distance measurements which they provide may obviate the need to know the distances between individual interferometers 64 and between individual reflectors 66, or to provide pre-calibration or mapping of the positions and orientations of the moving structure. See for example U.S. Pat. No. 4,457,625, in which the position of a single point is tracked by three interferometers, but the provision of a fourth tracking interferometer obviates such pre-calibration steps.

Figure 6:
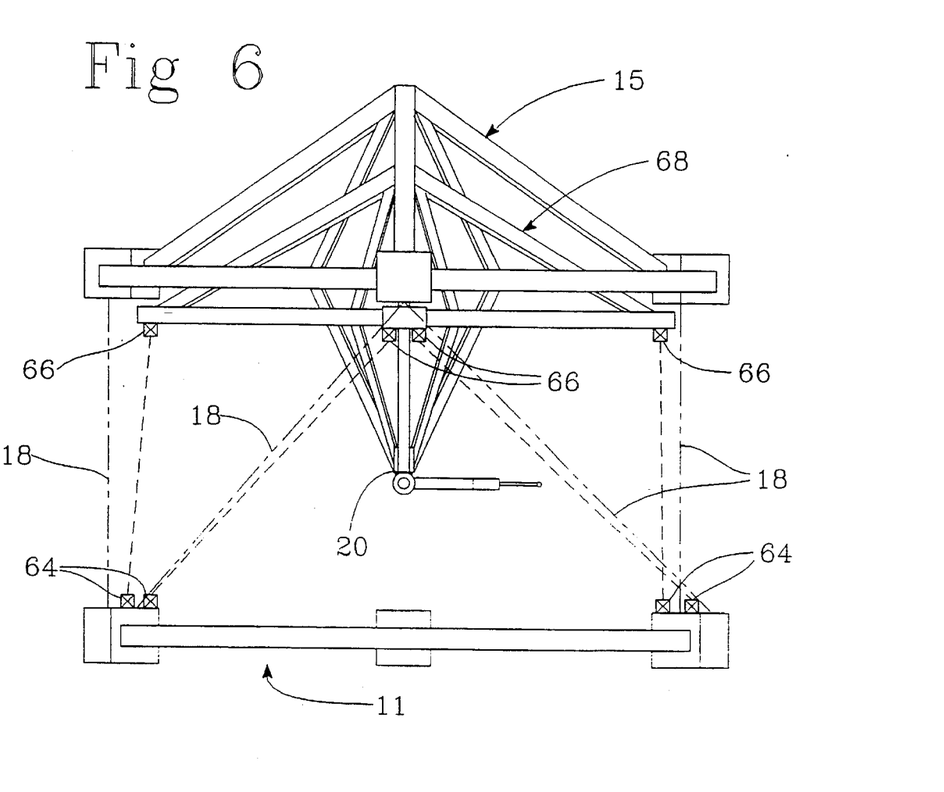
FIG. 6 is a side view of a modified coordinate measuring machine.

In the arrangement of interferometers and reflectors 64,66 shown in FIG. 2, each interferometer beam remains roughly parallel with one of the rams 18. It is therefore unlikely to be broken as the moving structure moves. Mounting the interferometers and reflectors 64,66 on relatively stable parts of the fixed and moving structures means that they are less likely to be affected by deflections of the rams 18 and of the bearings in which the rams are mounted. FIG. 6 illustrates a further development of this. The struts of the moving structure 15 are duplicated in a further space frame structure 68. The further space frame 68 is connected to the moving structure 15 only at the probe head 20. It is designed so as to be as light and rigid as possible, so as to suffer the least possible inertial deflections as the probe head 20 accelerates. The retroreflectors 66 are mounted on the duplicate space frame 68.

Since the duplicate frame 68 suffers from little or no inertial deflections, the interferometer outputs now provide a very accurate measure of the position and location of the probe head 20 and the attached probe 32. The measurements are entirely unaffected by any deflections in the struts 16,22–30 of the moving structure 15. Should deflections occur in that moving structure, the servo action of the control 64 will act to operate the friction drives 55 in such a manner as to ensure the correct position and orientation of the probe head 20 and probe 32, in spite of such deflections.

Of course, the duplicate space frame 68 may be simplified if desired, e.g. by duplicating only the struts 16,20 and 30. Such a simplified duplicate frame may then be connected to the load-bearing tetrahedral struts 24,26 of the machine shown in FIG. 2, in the same way as the load-bearing struts 28,30.

Figure 7:
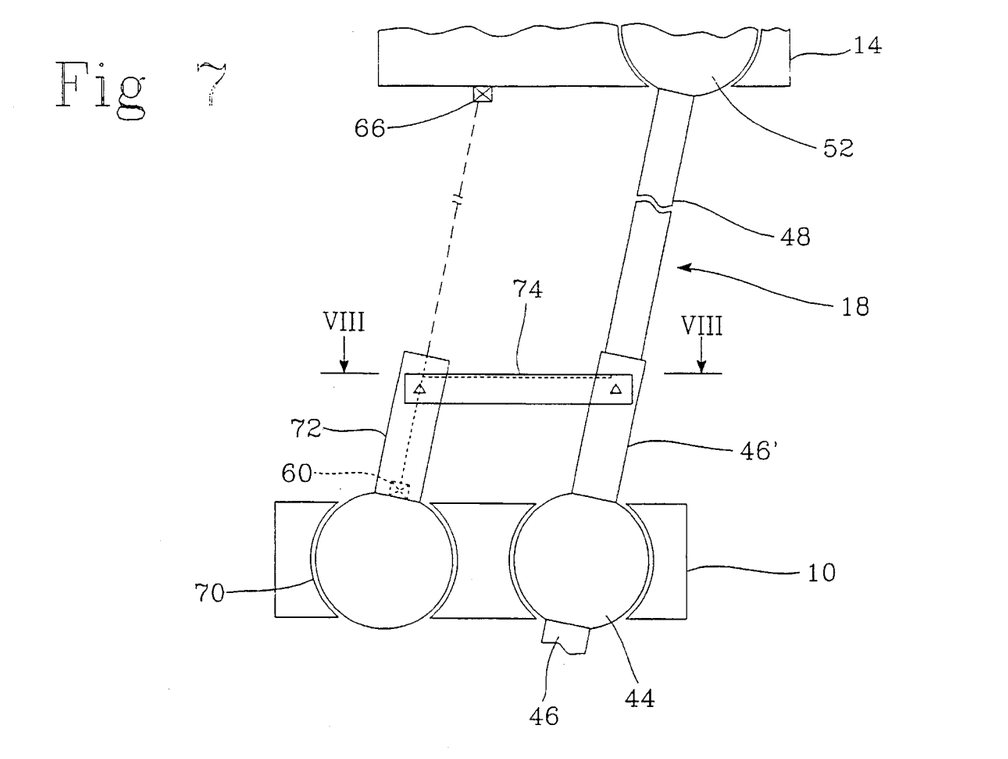
FIG. 7 shows the ram of FIG. 4, with a modified measuring arrangement.
Figure 8:
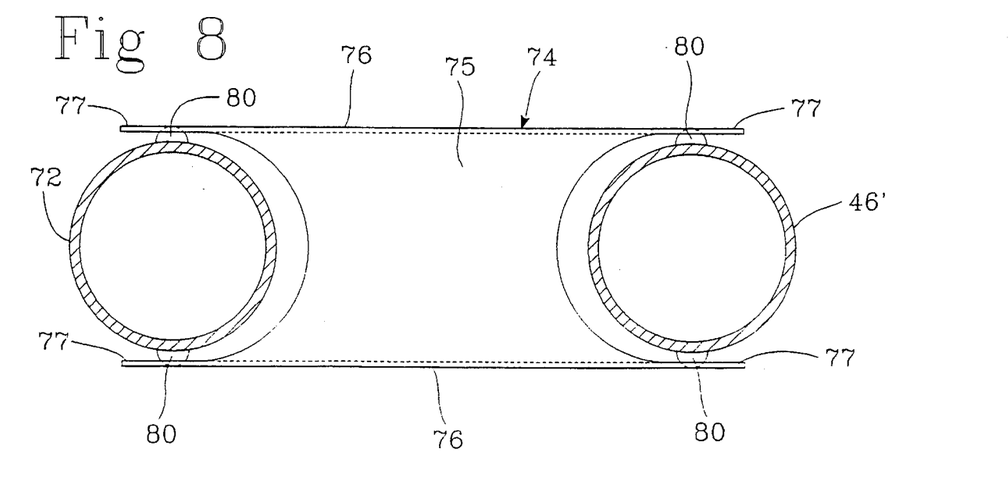
FIG. 8 is a view on the line VIII—VIII in FIG. 6.
Figure 9:
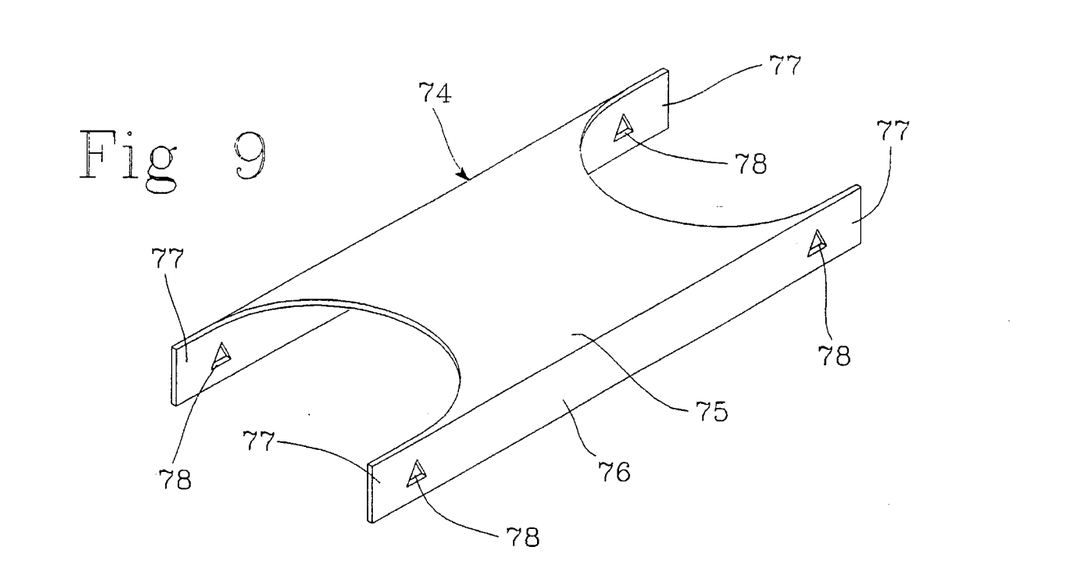
FIG. 9 is an isometric view of a component from FIGS. 7 and 8.

FIGS. 7–9 show a ram 18 according to FIG. 4, but with a modified measuring arrangement. Adjacent the air bearing ball 44 of the ram 18 is provided a further spherical air bearing 70. This carries a short tubular housing 72, containing the interferometer component 60 from FIG. 4. Above the ball 44, the housing 46 of the ram 18 has a short extension 46'. A parallelogram linkage member 74 is journalled to each of the housings 72,46', ensuring that the housing 72 moves in tandem with the movements of the ram 18. Thus, the interferometer beam from the interferometer 60 within the housing 72 always points at a retroreflector 66 which is mounted on the element 14 of the moving structure adjacent the air bearing ball 52 of the ram 18.

Since the parallelogram linkage member 74 always causes the interferometer 60 to point at the retroreflector 66, there is no need for the expensive pivoting mirror arrangements of a tracking interferometer as shown at 64 in FIGS. 2 and 6.

The parallelogram linkage member 74 should be such as to constrain the housing 72 to follow all the allowed tilting movements of the ram 18. As seen in FIGS. 8 and 9, this may be achieved using a channel section for rigidity. Thus, the member 74 comprises two sides 76 of the channel section, joined by a web 75. The sides 76 have extended portions 77 at each end, which are slightly springy, and each of which contains a triangular hole 78. Balls 80 are fixed at diametrically opposed journal points on each of the housings 72,46'. The balls 80 may be made of a hard material, e.g. synthetic ruby. In use, the extended end portions 77 of the side members 76 are snapped over the balls 80 as shown in FIG. 8, with one ball 80 engaging in each of the triangular holes 78. This gives an extremely precise three-point contact between each ball 80 and hole 78, ensuring that the parallelogram linkage member 74 is journalled to the housings 72,46' with no backlash.

Of course, other constructions can be envisaged for the parallelogram linkage member 74. For example, it may be replaced by two parallel struts corresponding to the side members 76. These struts may be linked by one or two diagonal struts to provide the necessary transverse stiffness in place of the web 75 of the channel section member 74. Rather than the triangular holes 78, precision adjustable bearings may be provided which journal the corresponding balls 80.

Of course, FIG. 7 can be modified in other ways. For example, there is no need for the bearing 70 on the housing 72 to be identical with the bearing 44 for the ram 18. Since it is only very lightly loaded, a simpler bearing may be possible. It is also possible to use bearings other than air bearings. Furthermore, the retroreflector 66 may be mounted as shown in FIG. 6, on a duplicate frame 68. Care will need to be taken, however, with the precise positioning and size of this retroreflector to ensure that it continues to receive the interferometer beam from the interferometer 60 even if the moving structure 15 is subject to inertial deflections.

Figure 10:
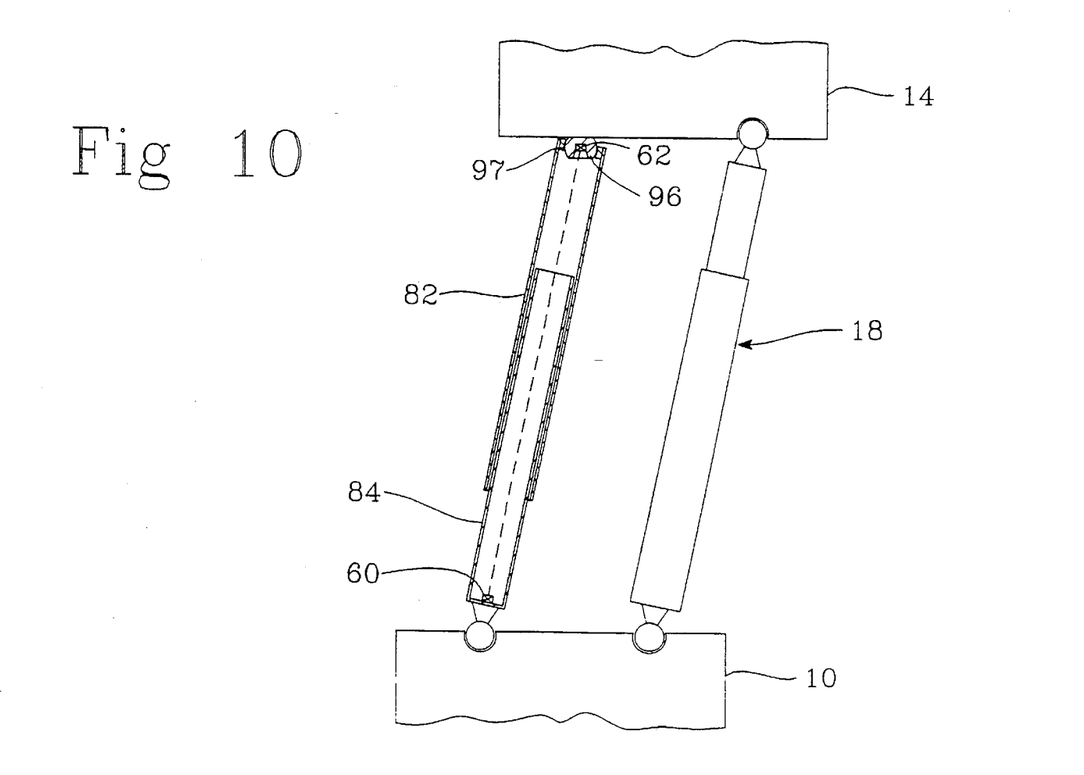
FIG. 10 shows a ram with an alternative measuring arrangement.

FIG. 10 shows a modification of the arrangement of FIG. 7. Here, the ram 18 may be a conventional hydraulic ram suitable for the loads found in machine tools. Parallel to the ram 18 there is provided a pair of telescopically interfitting housings 82,84. An interferometer light emitting and detecting unit 60 is mounted at one end of the housing 84, in association with the structure member 10. A retroreflector 62 is mounted at the centre of a spherical element 96 which is fast to the structure member 14 of the moving structure. The spherical element 96 forms one part of a spherical bearing 97 (e.g. an air bearing) by which the top end of the housing 82 is attached in a universally pivotable manner to the member 14.

The interferometer 60,62 measures the length between the ends of the housings 82,84 as they telescope, instead of measuring the length of the ram 18 as shown in FIG. 4. This is more accurate than the FIG. 4 arrangement, since the housings 82,84 are not subject to the deflections which would be caused by the loadings experienced by the ram 18 and by the bearings at each end of the ram 18.

Of course, if the moving structure is caused to tilt, the telescoping housings 82,84 will not remain parallel with the ram 18 and will have a different length from the ram 18. The same is true in FIG. 7. Nevertheless, the algorithms which calculate the position and orientation of the moving structure 15 do not need to be directly related to the lengths of the rams.

If it is desired to incorporate the interferometer in the ram 18, dispensing with the housings 82,84, then the spherical bearing 96,97 with its retroreflector 62 may be used in place of the bearing 52,90 of FIG. 4.

Figure 11:
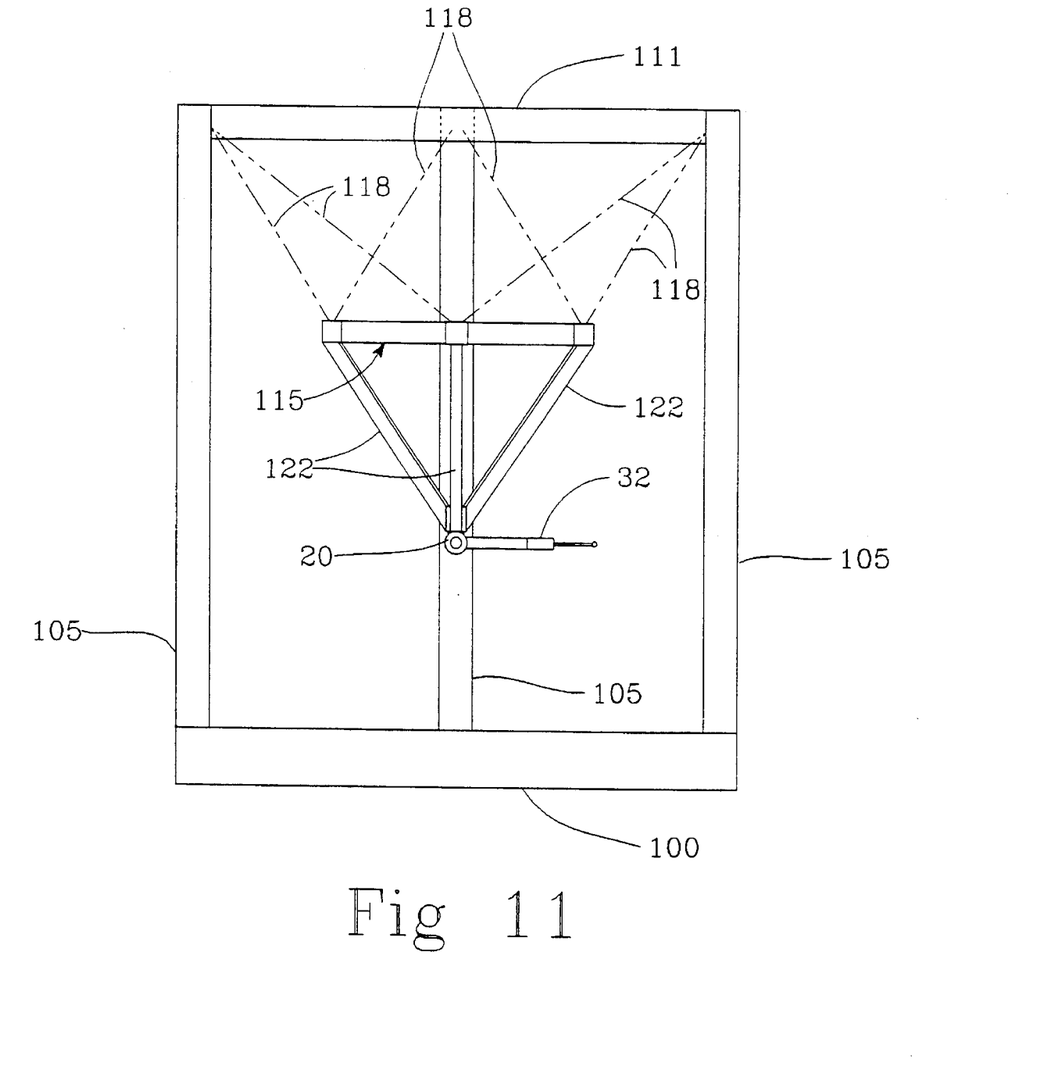
FIG. 11 is a side view of another embodiment of coordinate measuring machine.

FIG. 11 shows another embodiment. Here, a coordinate measuring machine has a fixed base 100, from which rise three triangularly-spaced upright pillars 105. The tops of the pillars 105 are joined together by struts, making up a triangular frame 111. This corresponds to the base frame 11 of FIGS. 1–3.

Below the fixed triangular frame 111, and between the pillars 105, there is provided a movable triangular frame structure 115. This corresponds to the movable frame 15 of FIGS. 1–3. As previously, the frame 115 is arranged as a mirror image of the frame 111, though of course it is somewhat smaller. Each corner of the triangular frame 115 is connected to two corners of the fixed triangular frame 111 (and vice versa) by six rams 118. These can be controlled in a similar manner to the rams 18 in FIGS. 1–3, in order to position and orient the triangular frame 115 relative to the fixed frame 111. As previously, the triangular frame 115 can be translated along any of the three axes X,Y,Z, or it can be tilted or rotated about any of these axes.

A probe head 20 and probe 32 are the same as described in relations to FIGS. 1–3. The probe head 20 is rigidly connected to the triangular frame 115 by three tetrahedral struts 122.

In operation, the machine of FIG. 11 is used in a similar manner to that of FIGS. 1–3. Also, all the measuring arrangements and other variants described above and shown in FIGS. 1–10 may also be used in connection with the machine of FIG. 11, with appropriate modifications. The structure of FIG. 11 may also be used in a machine tool, scanning machine, robot, flight simulator, positioning device, prototype manufacturing machine, etc.

The embodiments described have been hexapod machines, having six extensible legs or rams 18. However, the invention is equally applicable to machines having greater or less numbers of legs or rams, e.g. three. It can also be used in single legs or rams.

What is claimed is:

1. A machine comprising:

two support structures which are movable in three dimensions relative to each other;

a plurality of extensible legs connected between the support structures, a position and an orientation in said three dimensions of one support structure relative to the other being defined by the relative lengths of the extensible legs;

a plurality of interferometers acting between the support structures, each comprising a light emitting unit associated with one support structure and a reflector associated with the other support structure, wherein the reflector is rigidly mounted on its associated support structure.

2. A machine according to claim 1, wherein the light emitting unit of at least one of the interferometers is directed towards the corresponding reflector by a mechanical linkage connected to one of the extensible legs.

3. A machine according to claim 1, wherein the light emitting unit of at least one of the interferometers is directed towards the corresponding reflector by a mechanical linkage, the linkage forming an extensible leg which is connected between the support structures.

4. A machine according to claim 3, wherein the extensible leg which forms said linkage is a powered ram.

5. A machine according to claim 3, wherein the extensible leg which forms said linkage is provided in tandem with a powered ram.

6. A machine according to claim 3, wherein the extensible leg which forms said linkage has a pivotable bearing which connects it to one of the support structures, the reflector being provided within the pivotable bearing.

7. A machine according to claim 1, wherein the reflector is a retroreflector which directs a light beam from the light emitting unit back towards the light emitting unit.

8. A machine comprising:

two support structures which are movable relative to each other;

a plurality of extensible legs connected between the support structures, a position and an orientation of one support structure relative to the other being defined by the relative lengths of the extensible legs;

a plurality of interferometers acting between the support structures, each comprising a light emitting unit associated with one support structure and a reflector associated with the other support structure, wherein the reflector is rigidly mounted on its associated support structure, and wherein the light emitting unit of at least one of the interferometers is directed towards the corresponding reflector by a mechanical linkage connected to one of the extensible legs.

9. A machine comprising:

two support structures which are movable relative to each other;

a plurality of extensible legs connected between the support structures, a position and an orientation of one support structure relative to the other being defined by the relative lengths of the extensible legs;

a plurality of interferometers acting between the support structures, each comprising a light emitting unit associated with one support structure and a reflector associated with the other support structure, wherein the reflector is rigidly mounted on its associated support structure, and wherein the light emitting unit of at least one of the interferometers is directed towards the corresponding reflector by a mechanical linkage, the linkage forming an extensible leg which is connected between the support structures.

10. A machine according to claim 9, wherein the extensible leg which forms said linkage is a powered ram.

11. A machine according to claim 9, wherein the extensible leg which forms said linkage is provided in tandem with a powered ram.

12. A machine according to claim 9, wherein the extensible leg which forms said linkage has a pivotable bearing which connects it to one of the support structures, the reflector being provided within the pivotable bearing.

13. A machine according to claim 9, wherein the reflector is a retro-reflector which directs a light beam from the light emitting unit back towards the light emitting unit.

* * * * *